US008973879B2

(12) United States Patent
Kodama et al.

(10) Patent No.: US 8,973,879 B2
(45) Date of Patent: *Mar. 10, 2015

(54) CLAMP AND ELECTRONIC DEVICE ACCOMMODATING UNIT

(75) Inventors: Shinji Kodama, Makinohara (JP); Tomohiko Shimizu, Makinohara (JP)

(73) Assignee: Yazaki Corporation, Tokyo (JP)

( * ) Notice: Subject to any disclaimer, the term of this patent is extended or adjusted under 35 U.S.C. 154(b) by 480 days.

This patent is subject to a terminal disclaimer.

(21) Appl. No.: 12/723,972

(22) Filed: Mar. 15, 2010

(65) Prior Publication Data
US 2010/0271763 A1    Oct. 28, 2010

(30) Foreign Application Priority Data

Apr. 24, 2009 (JP) .................................. 2009-106705

(51) Int. Cl.
*A47B 96/00* (2006.01)
*H02G 3/32* (2006.01)
*H02G 3/08* (2006.01)
*H02G 3/16* (2006.01)

(52) U.S. Cl.
CPC .................. *H02G 3/32* (2013.01); *H02G 3/086* (2013.01); *H02G 3/16* (2013.01)
USPC .................. 248/226.11; 248/68.1; 248/309.1; 248/74.3; 24/293

(58) Field of Classification Search
USPC .................. 248/226.11, 226.12, 227.1, 227.2, 248/229.26, 74.3, 68.1, 51, 205.2, 309.1, 248/205.3; 439/620.21, 620.26, 620.01, 439/620.09, 95, 620.22, 404, 658, 701, 721, 439/76.2, 949, 417; 24/294, 295, 293; 361/799, 753; 174/51, 6, 40 CC, 78, 174/541, 59, 563, 520
See application file for complete search history.

(56) References Cited

U.S. PATENT DOCUMENTS

| 2,644,213 | A  | * | 7/1953  | Bedford, Jr. .................... 24/295 |
| 2,698,979 | A  | * | 1/1955  | Flora ............................... 24/293 |
| 5,368,261 | A  | * | 11/1994 | Caveney et al. ................. 248/73 |
| 6,715,185 | B2 | * | 4/2004  | Angellotti ....................... 24/297 |
| 6,805,524 | B2 | * | 10/2004 | Kanie et al. .................... 411/174 |
| 6,827,316 | B1 | * | 12/2004 | Arai ............................. 248/68.1 |
| 7,086,125 | B2 | * | 8/2006  | Slobodecki et al. ............ 24/295 |
| 7,091,215 | B2 | * | 8/2006  | Hibi et al. ...................... 514/300 |
| 7,152,281 | B2 | * | 12/2006 | Scroggie ........................ 24/297 |
| 7,165,371 | B2 | * | 1/2007  | Yoyasu ........................ 52/716.5 |
| 7,207,529 | B2 | * | 4/2007  | Rosemann et al. ............. 248/71 |

(Continued)

FOREIGN PATENT DOCUMENTS

| JP | 2001176617 A | 6/2001 |
| JP | 2004350365 A | 12/2004 |
| JP | 2009-22097 A | 1/2009 |

OTHER PUBLICATIONS

Office Action dated Jun. 25, 2013, issued by the Japanese Patent Office; in corresponding application No. 2009-106705.

*Primary Examiner* — Monica Millner
(74) *Attorney, Agent, or Firm* — Sughrue Mion, PLLC

(57) ABSTRACT

A clamp includes a base portion, a clamping portion and an urging member. The base portion is connected to a housing accommodating a device. The clamping portion is provided on a first face of the base portion, and clamps a mating member. The urging portion is provided on a second face of the base portion. The urging portion has elasticity, and urges the device in a case where the base portion is connected to the housing.

7 Claims, 7 Drawing Sheets

(56) References Cited

U.S. PATENT DOCUMENTS

| | | | |
|---|---|---|---|
| 7,328,489 B2 * | 2/2008 | Leverger et al. | 24/453 |
| 7,435,904 B2 * | 10/2008 | Peterson et al. | 174/72 A |
| 7,507,906 B2 * | 3/2009 | Suzuki | 174/68.1 |
| 7,594,629 B2 * | 9/2009 | Smutny et al. | 248/71 |
| 7,648,397 B2 * | 1/2010 | Shimizu | 439/620.21 |
| 7,698,787 B2 * | 4/2010 | Scroggie et al. | 24/297 |
| 7,744,425 B2 * | 6/2010 | Shimizu | 439/658 |
| 7,753,320 B2 * | 7/2010 | Geiger et al. | 248/71 |
| 7,753,402 B2 * | 7/2010 | Volkmann et al. | 280/728.2 |
| 7,759,584 B2 * | 7/2010 | Shimizu | 174/541 |
| 7,874,851 B2 * | 1/2011 | Shimizu | 439/92 |
| 7,927,050 B2 * | 4/2011 | Koike | 411/104 |
| 7,968,787 B2 * | 6/2011 | Ueki | 84/626 |
| 8,023,272 B2 * | 9/2011 | Shimizu | 361/752 |
| 8,046,880 B2 * | 11/2011 | Katoh et al. | 24/458 |
| 8,221,042 B2 * | 7/2012 | Vitali | 411/510 |
| 2004/0016088 A1 * | 1/2004 | Angellotti | 24/297 |
| 2004/0265094 A1 * | 12/2004 | Gordon | 411/508 |
| 2007/0270019 A1 * | 11/2007 | Yamaguchi et al. | 439/404 |
| 2009/0017653 A1 | 1/2009 | Shimizu | |

* cited by examiner

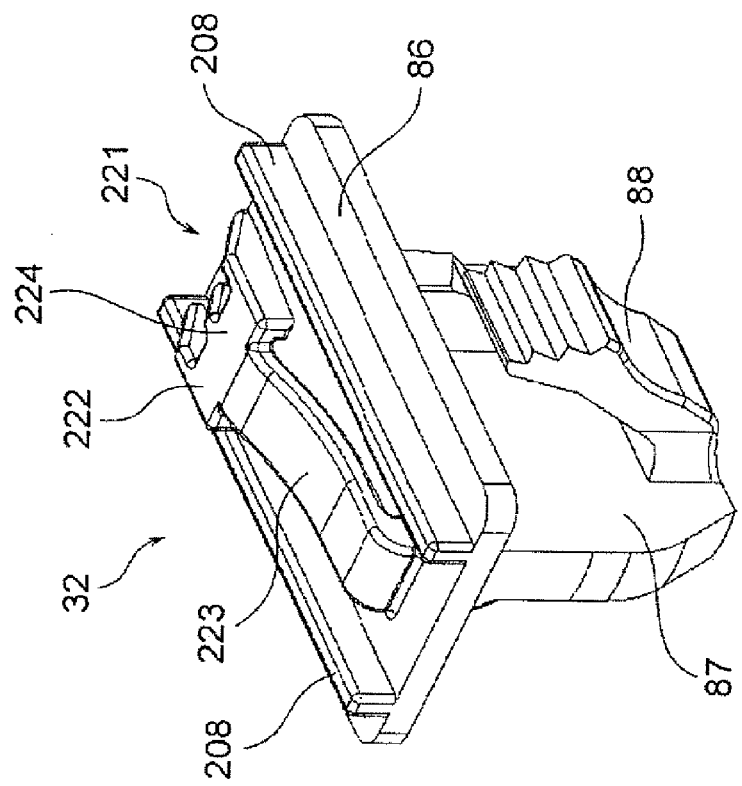
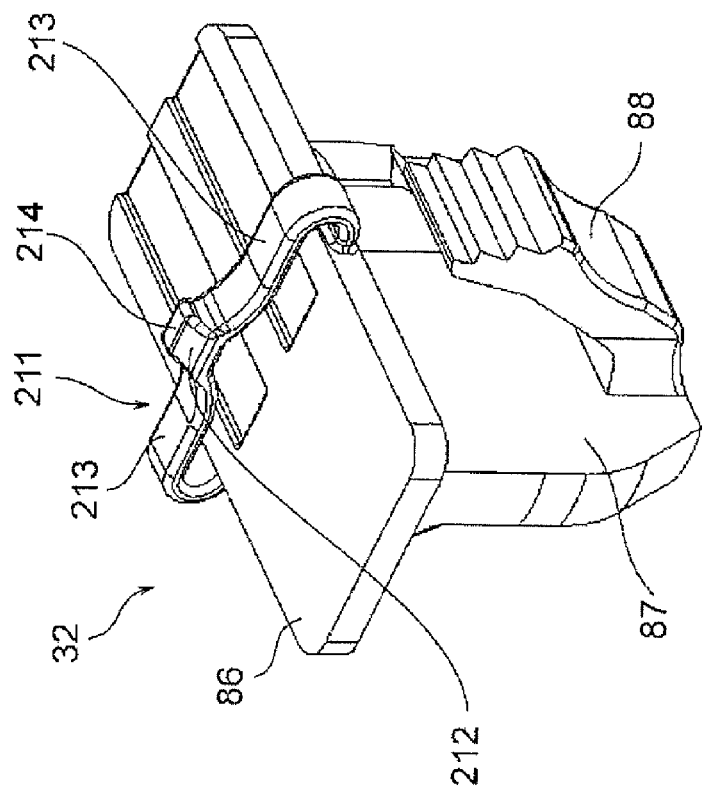
Fig. 6B
Fig. 6A

CLAMP AND ELECTRONIC DEVICE ACCOMMODATING UNIT

BACKGROUND

The present invention relates to a clamp having a locking function. Additionally, the invention relates to an electronic device accommodating unit which accommodates an electronic device in a case and which is attached to an intermediate portion of an electric wire.

For example, in various sensors which are fitted in a motor vehicle or the like, there are sometimes occurring situations in which conduction noise from noise sources having a high frequency device such as a horn or a wiper motor, foreign noise from neon advertising signs or induced noise is conducted through electric wires to thereby be inputted into the sensors, leading to a fear that the sensors malfunction. It is known to use an electronic device accommodating unit (a noise preventive device) for removing the various types of noise described above. The electronic device accommodating unit accommodates an electronic device in a case and is configured to be attached to an intermediate portion of an electric wire (see, Japanese Patent Publication No. 2009-22097 A).

A capacitor, a diode, a resistor and the like are used as the electronic device. For example, in the case of a capacitor, the capacitor has a main body (an electronic device main body) and a pair of leads extending from the main body. One of the pair of leads is welded to a circuit on an electric wire side. The other is welded to an earth terminal.

In the conventional electronic device accommodating unit, when vibrations or shocks are transmitted thereto from a vehicle after the electronic device accommodating unit is mounted in the vehicle, the electronic device main body may be vibrated by a space produced within the case. In the event that the vibration is large or continues, there is caused a fear that load is exerted on the weld portions of the leads. In a case where the weld portions of the lead is broken by the load so exerted, the removal of noise becomes to be affected badly.

SUMMARY

It is therefore one advantageous aspect of the present invention is to provide an electronic device accommodating unit which can suppress the vibration of an electronic device main body when vibrations or shocks are transmitted thereto from the outside. It is therefore another advantageous aspect of the present invention is to provide a clamp which can suppress the vibration of the electronic device main body.

According to one aspect of the invention, there is provided a clamp, comprising:

a base portion, configured to be connected to a housing accommodating a device;

a clamping portion, provided on a first face of the base portion, and configured to clamp a mating member; and an urging portion, provided on a second face of the base portion, having an elasticity, and configured to urge the device in a case where the base portion is connected to the housing.

The clamp may further comprise a rib portion, provided on the second face.

The clamp may be configured such that: the rib portion includes a first rib and a second rib; and the urging portion is disposed between the first rib and the second rib.

The clamp may be configured such that the urging portion includes: a contacting part, having a first face configured to come in contact with the device and a second face opposing the second face of the base portion; and a deforming part, connecting the contacting part to the base portion, and configured to be elastically deformed in a case where the contacting part comes in contact with the device.

The clamp may be configured such that the deforming part includes a first member extending from a first side of the contacting part, a second member extending from a second side of the contacting part opposite to the first side, and a third member extending from the second side of the contacting part in parallel to the second member.

The clamp may be configured such that the deforming part includes: a first member, extending from a first side of the contacting part, and connected to a third face of the base portion which connects the first face of the base portion and the second face of the base portion; and a second member, extending from a second side of the contacting part opposite to the first side, and connected to a fourth face of the base portion opposite to the third face.

The clamp may be configured such that: the deforming part is extended from the second face of the base portion so as to be a cantilever.

According to another aspect of the invention, there is provided an electronic device accommodating unit, comprising:

a housing, having a recess;

a lid member, connected to the housing, and covering the recess to define an accommodating chamber configured to accommodate a device;

an urging member, provided on the lid member and disposed in the accommodating chamber, the urging member configured to come in contact with the device and to elastically urge the device.

The electronic device incorporating unit may further comprises a clamp, provided with the lid member, monolithically formed with the urging member, and configured to clamp a mating member.

The electronic device incorporating may be configured such that the lid member is monolithically formed with the urging member.

BRIEF DESCRIPTION OF THE DRAWINGS

FIG. 6A is a perspective view showing a clamp according to a second embodiment of the present invention.

FIG. 6B is a perspective views showing a clamp according to a third embodiment of the present invention.

DETAILED DESCRIPTION OF EXEMPLIFIED EMBODIMENTS

[First Embodiment]

Figure 1:
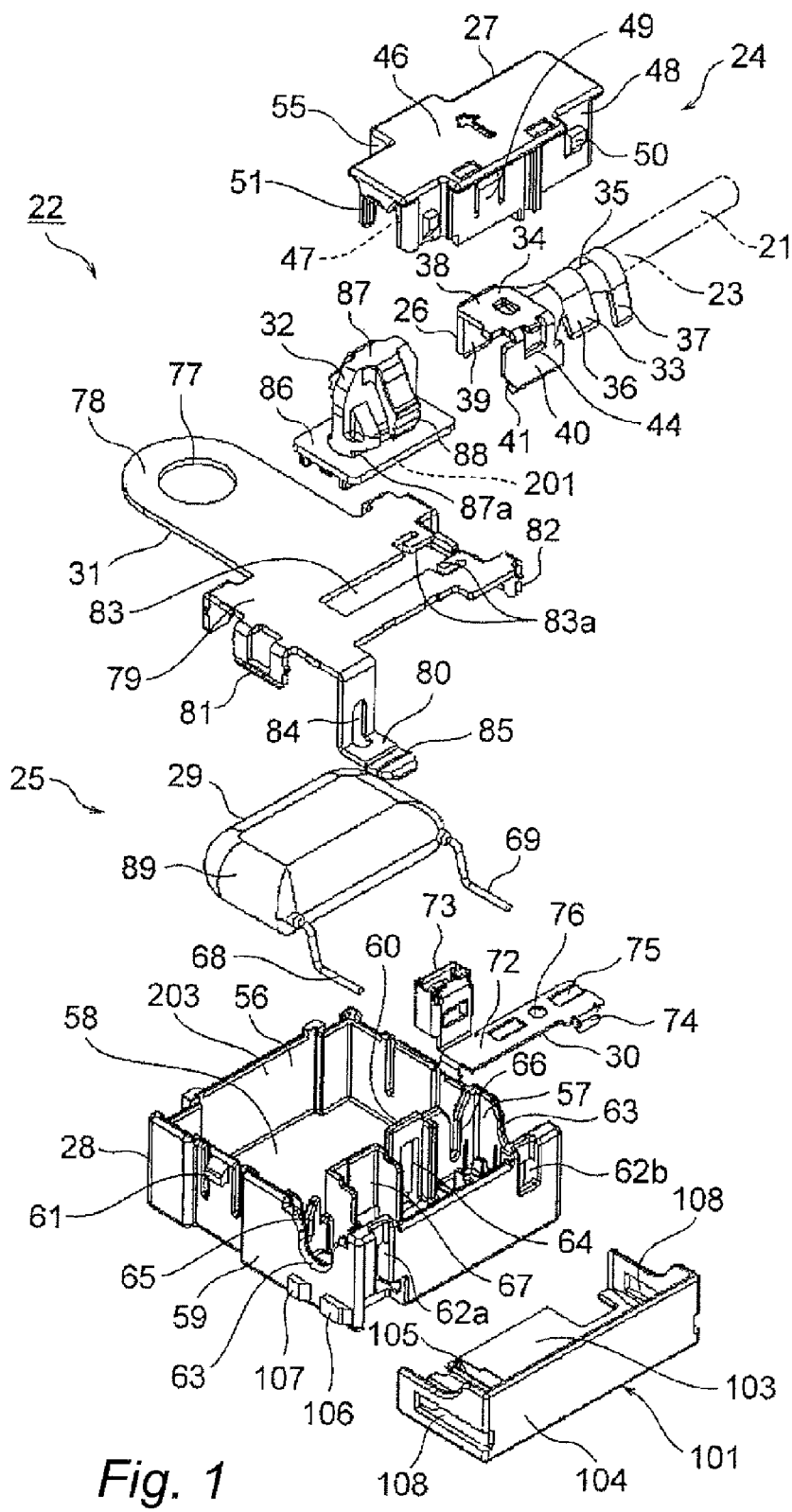
FIG. 1 is an exploded perspective view of an electronic device accommodating unit according to a first embodiment of the prevent invention.

Referring to the drawings, a first embodiment will be described.

In FIG. 1, reference numeral 21 denotes a known electric wire. Reference numeral 22 denotes an electronic device accommodating unit which is connected to an intermediate portion 23 of the electric wire 21 (refer to FIG. 2). The electronic device accommodating unit 22 includes a cover assembled electric wire 24 which is attached to the intermediate portion 23 of the electric wire 21 in advance, a unit main body 25 which is electrically connected by the cover assembled electric wire 24 being fitted thereon, a short-circuit prevention cover 101 which is retrofitted to the unit main body and an elastic portion 201 which is provided within the unit main body 25.

The cover assembled electric wire 24 has, in addition to the electric wire 21, an electric wire side terminal 26 and a cover member 27. The unit main body 25, on which the cover assembled electric wire 24 is fitted, includes a case 28, an electronic device 29, a relay terminal 30, an earth terminal 31, and a clamp 32. The case 28 and a base portion 79, which will be described later, of the earth terminal 31 constitute a housing. In addition, the electronic device 29 corresponds to a device. The short-circuit prevention cover 101 is assembled to the unit main body 25 as required. In the embodiment, the elastic portion 201 is integrated into the clamp 32 according to the invention. The integration of the elastic portion 201 into the clamp 32 is an example of a way of providing the elastic portion 201 in the unit main body 25. Hereinafter, respective configurations of the constituent members described above will be described.

In the description of the embodiment, although not limited particularly to such an application, the electric wire 21 is laid out on a vehicle such as a motor vehicle or the like. The electric wire 21 can also be applied to other applications than for motor vehicles. The electronic device accommodating unit 22 is configured to be locked and fixed to a predetermined bearing face of a vehicle body.

The electric wire 21 is one of a plurality of electric wires which make up a wiring harness or an independent electric wire and includes a conductor and an insulating covering portion which covers the conductor. The electric wire side terminal 26 is electrically connected to the intermediate portion 23 of the electric wire 21 configured as described above.

The electric wire side terminal 26 is made of a metal having electric conductivity and has an electric wire connecting portion 33 which is connected directly to the conductor and an electric contact portion 34 which continuously stretches to a front side of the electric wire connecting portion. Reference numeral 35 denotes a bottom portion of the electric wire side terminal 26. The electric wire connecting portion 33 has a pair of conductor clamping pieces 36 which clamps the conductor which is exposed by stripping off a covering of the intermediate portion 23 of the electric wire 21 and a pair of covering clamping portions 37 which clamps the covering portion.

The electrical contact portion 34 has a base portion 38, a connecting tab 39 which is provided consecutively to one side portion of the base portion 38, a locking portion 40 which is provided consecutively to the other side portion of the base portion 38 and a rib abutment portion 41 which is provided consecutively to the locking portion 40. The electric contact portion 34 is formed by bending. The base portion 38, the connecting tab portion 39 and the locking portion 40 are formed into a U-shaped configuration by bending. The electric wire 21 is configured to pass through a space defined between the connecting tab 39 and the locking portion 40.

The rib abutment portion 41 is provided consecutively to the locking portion 40 by bending. The rib abutment portion 41 is formed so as to be parallel to the base portion 38. The rib abutment portion 41 is formed to have a width which gives no pain to a working person even when the working person presses the rib abutment portion 41.

A locking hole 44 for locking is formed in the locking portion 40 so as to penetrate therethrough. The locking hole 44 is formed as a portion which prevents the dislocation of the electric wire side terminal 26 from the cover member 27. The connecting tab 39 has a tab shape and is formed as a portion which is inserted into the relay terminal 30 of the unit main body 25 to establish an electrical connection.

The electric wire side terminal 26 is configured to be inserted into an interior of the cover member 27 from a bottom portion 35 side thereof in such a state that it is connecting to the intermediate portion 23 of the electric wire 21. Once locked in the cover member 27, the electric wire side terminal 26 is prevented from coming off the cover member 27. The electric wire side terminal 26 is configured to easily be inserted into the interior of the cover member 27 by being pressed by the working person.

The cover member 27 is made of a synthetic resin having insulating properties and has a configuration not only to lock the electric wire side terminal 26 but also to fit in the case 28 of the unit main body 25. The cover member 27 has a ceiling wall 46 and a side wall which continuously extends from the ceiling wall 46. The side wall is formed so that an inside of the side wall constitutes an electric wire accommodation portion 47. In addition, the side wall is formed so that an outside thereof constitutes a case insertion guide portion 48 which performs as a guide when the cover member 27 is inserted into the case 28.

In addition, a flexible arm shape locking projection 49 is formed on the side wall. A plurality of cover side fitting portions 50, which substantially look like projections, are formed on the side wall. The locking projection 49 is formed as portion which locks the electric wire side terminal 26 which is inserted into the interior of the cover member 27. The cover side fitting portions 50 are formed so as to fit in the case 28.

Further, a pair of U-shaped electric wire supporting portions 51 are formed on the side wall for supporting the electric wire 21 which is press fitted therebetween. Although the electric wire 2 is preferably supported in such a press fitted condition, any other constructions than this press fit supporting construction may be adopted, provided that the electric wire 21 can be maintained horizontal when the cover member is mounted thereon. In any case, such constructions can contribute to preventing the electric wire 21 from being bent or being inserted obliquely. Furthermore, a protruding portion 55 is formed so as to correspond to the connecting tab 39.

The case 28 of the unit main body 25 is made of a synthetic resin having insulating properties and has an electronic device accommodation recess portion 56 and a fitting connection recess portion 57 which lies adjacent to the electronic device accommodation recess portion 56. The electronic device accommodation recess portion 56 and the fitting connection recess portion 57 are formed by being surrounded by a bottom wall 58, a side wall 59 which is formed around an edge portion of the bottom wall 58 and a bulkhead 60. The electronic device accommodation recess portion 56 is formed as a recessed portion for accommodating the electronic device 29. The fitting connection recess portion 57 is formed as a recessed portion into which the cover assembled electric wire 24 is fitted for electrical connection. The electronic device accommodation recess portion 56 and the fitting connection recess portion 57 are separated by the bulkhead 60.

Locking projections 61 and projecting locking portions 62a, 62b are formed on the side wall 59. In addition, a pair of electric wire supporting portions 63 are formed on the side wall 59. Further, a pair of temporary locking projections 106 and a pair of permanent locking projections 107 are formed on the side wall 59 for the short-circuit prevention cover 101. Only one of each pair of locking projections is shown in the drawings. The projecting locking portions 62a, 6b are formed as portions into which the cover assembled electric wire 24 is fitted. The projecting locking portion 62a is formed so as to penetrate vertically or transversely through the side wall 59 so that port of the short-circuit prevention cover 101 can be inserted into an interior of the fitting connection recess portion 57. The projecting locking portion 62a is formed long in a vertical direction.

The pair of electric wire supporting portions 63 are formed by cutting out portions of the side wall 59 which correspond to the fitting connection recess portion 57 into a U-shape. When the cover assembled electric wire 24 is fitted in the case 28, the electric wire 21 is inserted in the pair of electric wire supporting portions 63 so as to be supported therein.

A projecting locking portion 64, lead supporting portions 65, 66 and a protruding portion 67 are formed on the bulkhead 60. The projecting locking portion 64 is formed as a portion on which the cover assembled electric wire 24 is fitted. The lead supporting portions 65, 66 are formed to support leads 68, 69 of the electronic device 29 accommodated in the electronic device accommodation recess portion 56 which extend to the fitting connection recess portion 57. The lead supporting portions 65, 66 are each formed into a slit shape.

Welding holes 102 (refer to FIG. 3) are formed in two locations on the bottom wall 58 which penetrate to the fitting connection recess portion 57. These welding holes 102 are formed in the two locations to so penetrate so that the lead 69 of the electronic device 29 and a welding portion 75, which will be described later, of the relay terminal 30 and the lead 68 of the electronic device 29 and a welding portion 85, which will be described later, of the earth terminal 31.

The relay terminal 30 is made of a metal having electric conductivity and has a bus bar shaped fixed base plate portion 72 and a tab connecting portion 73 which is provided consecutively to one side portion of the fixed base plate portion 72 for insertion of the connecting tab 39 of the electric wire side terminal 26. The fixed base plate portion 72 is formed so as to be fixedly placed on a bottom (the bottom wall 58) of the fitting connection recess portion 57.

A plurality of fixing claws 74 are formed on the fixed base plate portion 72 which are caught on the bottom of the fitting recess portion 57 so as to prevent the relay terminal 30 coming thereoff. The welding portion 75 having a convex shape is formed on the fixed base plate portion 72 which is brought into contact with the lead 69 of the electronic device 29 so as to be welded thereto when the relay terminal 30 is assembled on to the bottom of the fitting connection recess portion 57. Reference numeral 76 denotes a through hole which enables insertion into a predetermined fixing portion, not shown, on the fitting connection recess portion 57 for positioning.

The tab connecting portion 73 has a box shape. An elastic contact piece (whose illustration is omitted) is formed in an interior of the tab connecting portion 73 which is adapted to contact elastically the connecting tab 39 of the electric wire side terminal 26.

The earth terminal 31 is made of a metal having electric conductivity and has an earth portion 78 having a screwing through hole 77, a base portion 79 (a lid portion) which extends continuously from the earth portion 78 and has a shape as a cover (a lid member) which covers an opening portion of the electronic device accommodation recess portion 56 and a connecting leg portion 80 which extends continuously from the base portion 79.

The base portion 79 performs as the cover (the lid member), and is formed with fitting portion 81, 82 are formed on the base portion 79 which are caught on the locking portions 61 on the case 28. In addition, a clamp attaching and detaching portion 83 is formed in the base portion 79 where the clamp 32 is attached, whereby the clamp 32 is inserted in the bearing face of the vehicle body to be locked therein. The clamp attaching and detaching portion 83 is formed to be disposed in a position above an electronic device main body 89, which will be described later, of the electronic device 29 accommodated in the electronic device accommodation recess portion 56.

The fitting portions 81, 82 each have a substantially frame shape and are formed so as to be suspended from side portions of the base portion 79. The fitting portions 81, 82 are flexible enough to ride over the locking projections 61 of the case 28. The clamp attaching and detaching portion 83 is formed into a slit shape by cutting out part of the base portion 79. The clamp attaching and detaching portion 83 is formed so that the clamp 32 is slid to be fixed in the clamping attaching and detaching portion 83 after the clamp 32 has been inserted therein. A portion of the clamp attaching and detaching portion 83 into which the clamp 32 is inserted is formed consecutively to the fitting portion 82. A pair of locking projecting portions 83a are formed on the clamp attaching and detaching portion 83 for locking the clamp 32 assembled by sliding. The pair of locking projecting portions 83a are formed so as to be caught on a base plate 86, which will be described later, of the clamp 32 for preventing the dislocation of the clamp 32 from the clamp attaching and detaching portion 83. The clamp 32 is configured to be removed from the clamp attaching and detaching portion 83 when the locking condition of the clamp 32 by the locking projecting portions 83a is released.

The connecting leg portion 80 is a portion that is to be inserted into the fitting connection recess portion 57 and is formed by bending a strip piece into an L-shape. A slit 84 is formed in a portion of the connecting leg portion 80 which is bent into the L-shape so as to allow the lead 68 to escape therethrough. The welding portion 85 having a convex shape is formed on the connecting leg portion 80 at a portion which corresponds to the bottom of the fitting connection recess portion 57 so as to be brought into contact with the lead 68 for welding.

The clamp 32 is made of a synthetic resin and is constructed so as not only to be detachably attached to the earth terminal but also to be inserted into the bearing portion of the vehicle body to thereby be locked in that portion. The clamp 32 has the elastic portion 201 (refer to FIG. 3) integrated thereinto and is constructed so as to suppress the vibration of the electronic device main body 89, which will be described later, of the electronic device 29.

The clamp 32 performs as a locking portion. The clamp 32 has the base plate 86 which is parallel to the base portion 79 of the earth terminal 31, a strut 87 which is provided on a front face (an upper face) of the base plate 86 and a pair of locking wings 88 which are flexible and are provided consecutively to the strut 87. The clamp 32 is such that the pair of locking wings 88 are inserted into a clamp hole formed in the bearing face of the vehicle body so that respective end portions of the locking wings 88 can be caught on an opening edge of the clam hole. A pair of engagement recess portions 87*a* are formed at a proximal end portion of the strut portion 87 into which an opening edge portion of the clamp attaching and detaching portion 83 is inserted when the clamp 32 is assembled into the clamp attaching and detaching portion 83 by sliding. The elastic portion 201 is disposed on a rear face (a lower face) of the base plate 86.

The electronic device 29 has the electronic device main body 89 and the pair of leads 68, 69. In this embodiment, although a known capacitor is used as the electronic device 29 so as to perform as a noise filter, a diode or a resistor may be used to meet other applications.

Figure 3:
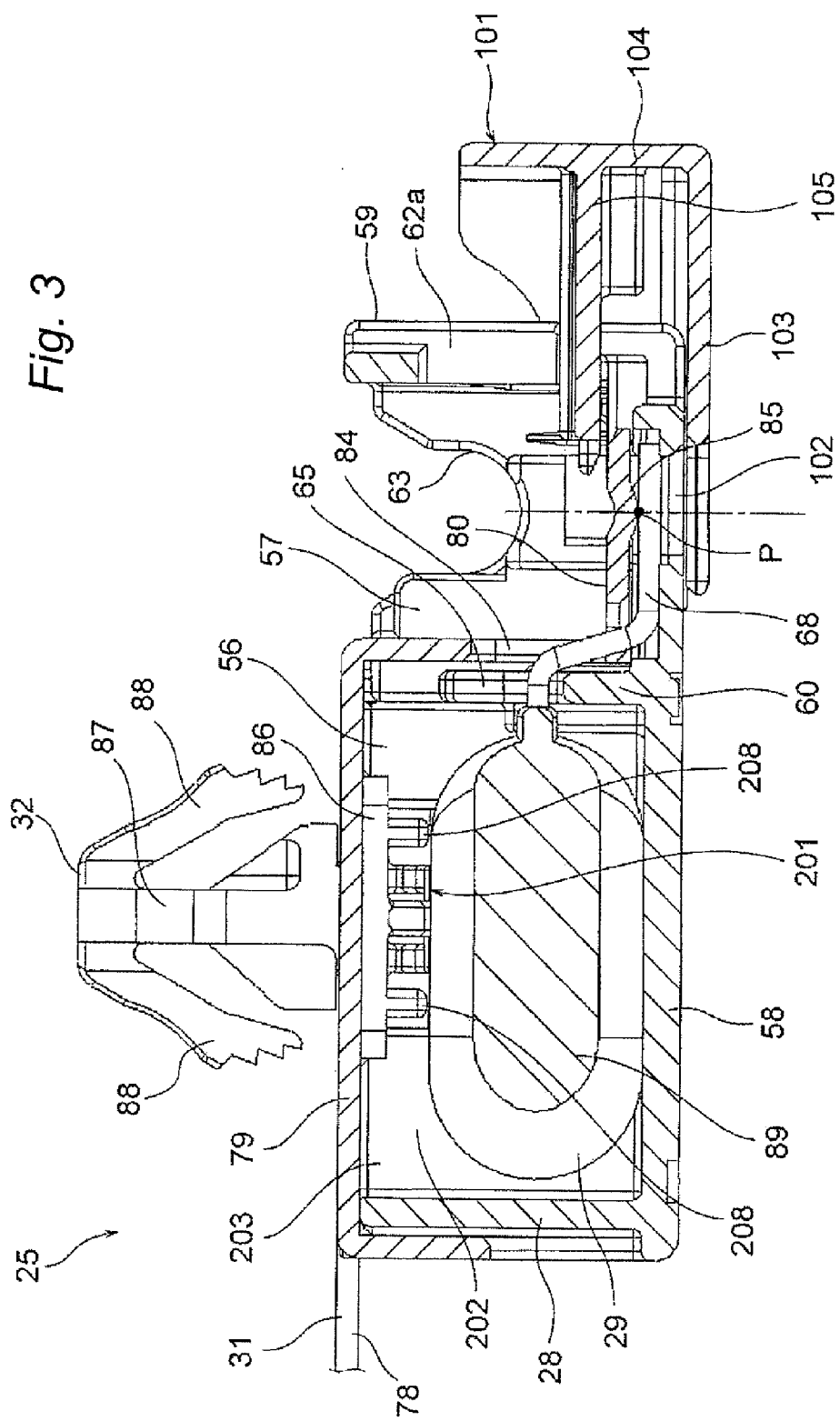
FIG. 3 is a sectional view of the electronic device accommodating unit shown in FIG. 1.

In FIG. 3, the elastic portion 201 is provided as a portion that prevents the vibration of the electronic device main body 89 due to a space 202 produced between the base portion 79 of the earth terminal 31 and the electronic device main body 89 of the electronic device 29 within the case 28. The elastic portion 201 is disposed to match the position of an opening portion 203 in the case 28. The elastic portion 201 is formed so as to be brought into contact with the electronic device main body 89 to thereby press the electronic device main body 80 towards the bottom wall 58 of the case 28.

Figure 4:
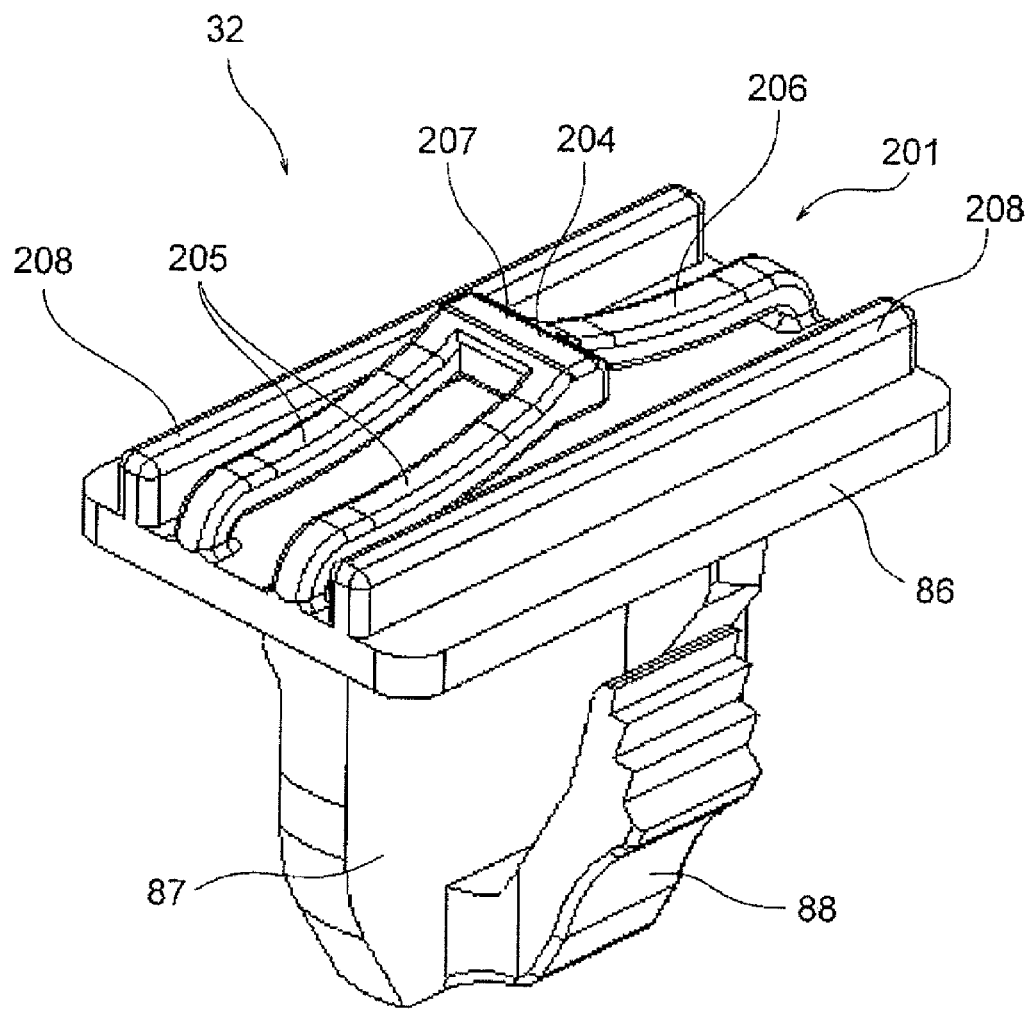
FIG. 4 is a perspective view of a clamp of the electronic device accommodating unit shown in FIG. 1, as viewed from an elastic portion side.

In FIGS. 3, 4, the elastic portion 201 has a contact portion 204 performing as a portion to be brought into contact with the electronic device main body 89 and spring portions 205, 206 which connect the rear face (the lower face) of the base plate 86 and the contact portion 204 of the clamp 32. The contact portion 204 is disposed in a position which is spaced apart from the base plate 86 and has a base side face which can be brought into abutment with the base plate 86 and a contact face 207 which is position on an opposite side to the base side face so as to be brought into contact with the electronic device main body 89. The base side face may not be brought into abutment with the base plate 86. The pair of spring portions 205 are formed at both ends of one of lateral side faces of the contact portion 204 which constitute a longitudinal side thereof so as to be consecutive thereto. The spring portion 206 is formed at a center of the other lateral side face. The spring portions 205, 206 are formed so as to have elasticity. Elastic portions 201 according to other examples will be described later by reference to FIG. 6. A pair of ribs 208 are formed on the base plate 86. The ribs 208 are formed to be disposed on both sides of the elastic portion 201. The ribs 208 are formed as portions which can restrict excessive elastic deformation of the elastic portion 201. The ribs 208 are configured to contribute to not only the prevention of permanent set in fatigue of the elastic portion 201 but also maintenance of the performance of the elastic portion 201. At least one rib 208 can prevent a decrement of an elastic restoring force and a settling of the elastic portion 201, thereby can maintain the performance of the elastic portion 201.

Figure 2:
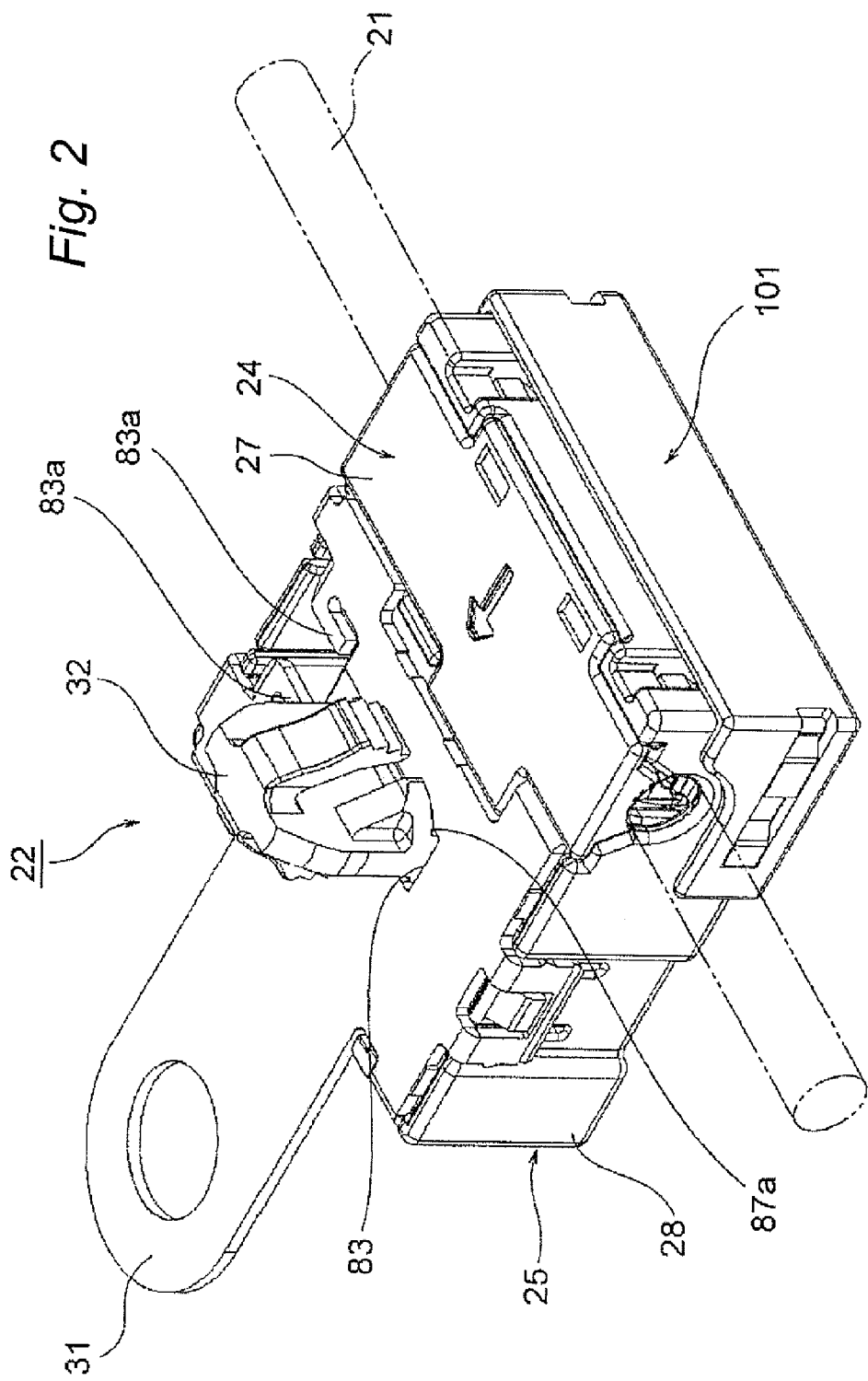
FIG. 2 is a perspective view of the electronic device accommodating unit shown in FIG. 1.

In FIGS. 1 to 3, the short-circuit prevention cover 101 is made of a synthetic resin having insulating properties and is formed so as to cover the bottom wall 58 and the side wall 59 of the case 28 when it is located in the position of the fitting connection recess portion 57. The short-circuit prevention cover 101 has a rectangular bottom wall confronting portion 103, a U-shaped side wall confronting portion 104 which is formed consecutively to three side edge portions of the bottom wall confronting portion 103 and an inserting portion 105 which projects from an inner face of the side wall confronting portion 104. The bottom wall confronting portion 103 covers the bottom wall 58 of the case 28, and a pair of projecting locking portions 108 are formed in the U-shaped side wall confronting portion 104 so as to penetrate therethrough to thereby be caught on the pair of temporary locking projections 106 and the pair of permanent locking projections 107 which are both formed on the side wall 59 of the case 28.

The inserting portion 105 is formed as a portion to be inserted into the fitting connection recess portion 57 through the projecting locking portion 62*a* formed in the side wall 59 of the case 28. The inserting portion 105 is formed so as to cover the weld portion where the lead 68 of the electronic device 29 and the connecting leg portion 80 of the earth terminal 31 are welded together while pressing it down from thereabove. The inserting portion 105 is formed into a long rib shape or an elongated strip shape.

Next, the assemblage of the cover assembled electric wire 24, assemblage of the unit main body 25, assemblage of electronic device accommodating unit 22 and mounting of the electronic device accommodating unit 22 will be described based on the configurations described heretofore.

As to the cover assembled electric wire 24, firstly, the covering portion of the electric wire 21 is removed over the predetermined range at the intermediate portion 23 of the electric wire 21 which constitutes the desired position so as to expose the conductor thereat, and the electric wire side terminal 26 is connected to the conductor so exposed. Next, the electric wire side terminal 26 is inserted into the interior of the cover member 27 from the bottom portion 35 side so that the electric wire side terminal 26 is locked therein. When the electric wire side terminal 26 is locked relative to the cover member 27, the assemblage of the cover assembled electric wire 24 is completed.

The electric wire side terminal 26 is accommodated in the electric wire accommodation portion 47 of the cover member 27 and is protected by the cover member 27. The electric wire 21 is supported by the electric wire supporting portion 51 of the cover member 27. The assemblage of the cover assembled electric wire 24 is completed in such a state that the electric wire 21 is held in the horizontal condition.

As to the unit main body 25, firstly, the electronic device main body 89 of the electronic device 29 is accommodated in the electronic device accommodation recess portion 56 of the case 28, and respective distal end sides of the leads 68, 69 are placed to be positioned on the bottom of the fitting connection recess portion 57 while intermediate portions of the leads 68, 69 of the electronic device 29 are inserted into the lead supporting portions 65, 66. Next, the relay terminal 30 and the connecting leg portion 80 of the earth terminal 31 are attached to the predetermined positions on the fitting recess connection recess portion 57. As this occurs, the base portion 79 of the earth terminal 31 fits in the case 28 while covering the electronic device accommodation recess portion 56 which accommodates the electronic device main body 89 of the electronic device 29. The clamp 32 is fixed in the clamp attaching and detaching portion 83 in the base portion 79 in advance, and when the base portion 79 covers the electronic device accommodation recess portion 56, the elastic portion 201, which is integrated into the clamp 32, is brought into contact with the electronic device main body 89 so as to bias the same main body 89. The electronic device main body 89 is disposed in the predetermined position. Following this, welding is applied individually to the relay terminal 30 and the connecting leg portion 80, so that the respective convex welding portions 85, 75 and the corresponding leads 68, 69 are fixed to each other. By doing so, the assemblage of the unit main body 25 is completed.

Figure 5:
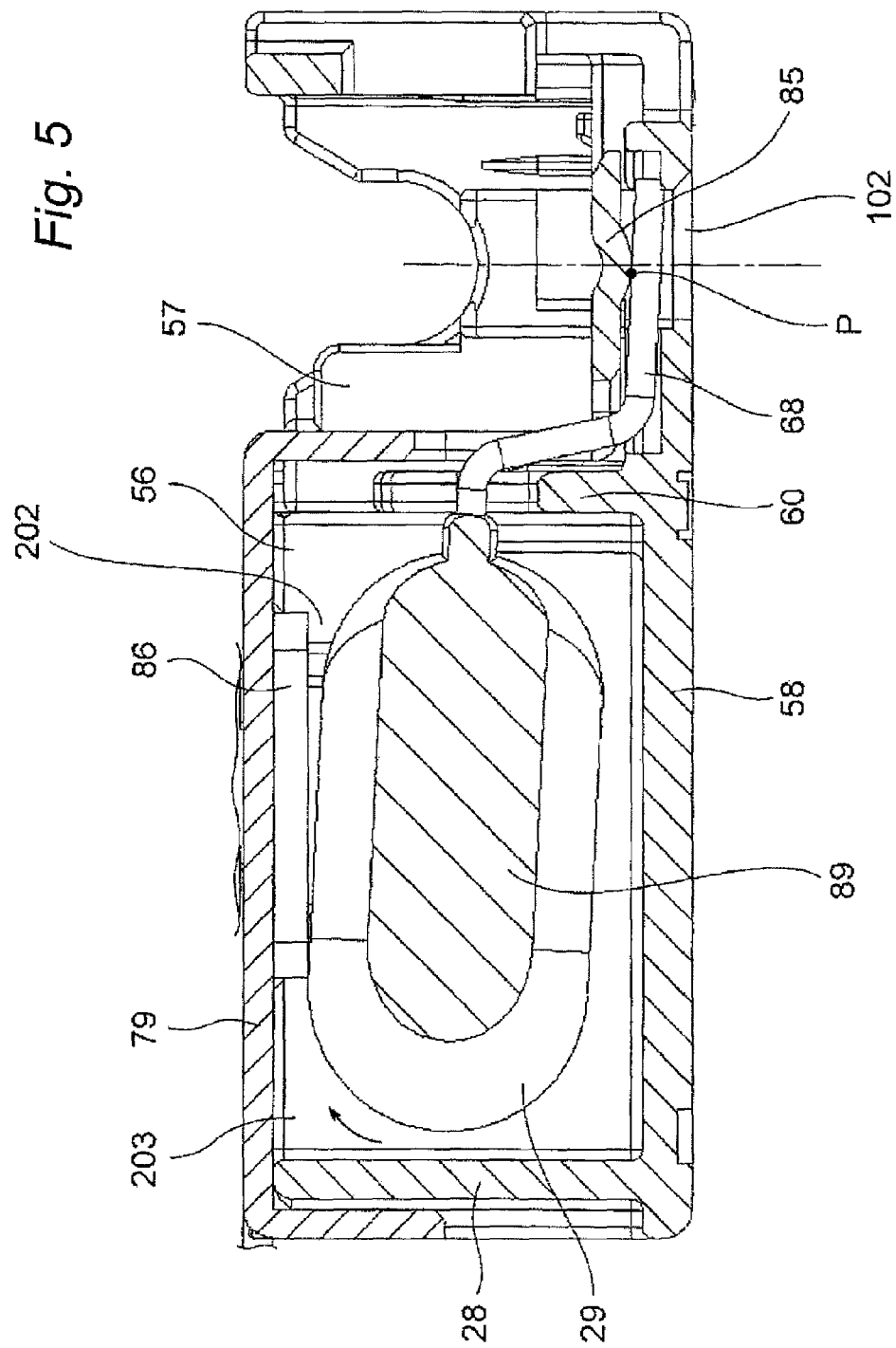
FIG. 5 is a sectional view showing a comparison example of an electronic device accommodating unit which has no elastic portion.

As to the welding of the leads 68, 69 at the welding portions, when the electronic device main body 89 is pressed by the elastic portion 201, the positions of the leads 68, 69 and the corresponding welding portions 85, 75 are stabilized, and there is caused no such situation that welding points P (refer to FIG. 3) are shifted. However, in a case that the elastic portion 201 being not present, the welding point P is shifted as is shown in FIG. 5, and hence, no stable welding may be occurred. The elastic portion 201 is effective in preventing the shifting of the welding points P.

After the completion of the assemblage of the cover assembled electric wire 24 and the assemblage of the unit main body 25, firstly, the cover assembled electric wire 24 is fitted in the fitting connection recess portion 57 of the unit main body 25, and at the same time as this occurs, an electrically connecting condition is established. By doing so, the assemblage of the portion having the basic function of the electronic device accommodating unit 22 is completed. Either the cover assembled electric wire 24 or the unit main body 25 may be assembled first. Next, the short-circuit prevention cover 101 is attached to the electronic device accommodating unit 22 so that a short-circuit preventing function is given to the electronic device accommodating unit 22. When the short-circuit prevention cover 101 is so attached, the bottom wall confronting portion 103 of the short-circuit prevention cover 101 covers the welding holes 102 in the bottom wall 58 of the case 28, and the U-shaped side wall confronting portion 104 of the short-circuit prevention cover 101 covers the side wall 59 of the case 28. Consequently, the portions covered by the short-circuit prevention cover 101 are shut off from the outside. As this occurs, in the interior of the fitting connection recess portion 57, the weld portion where the lead 68 of the electronic device 29 and the connecting leg portion 80 of the earth terminal 31 are welded together is covered by the inserting portion 105 of the short-circuit prevention cover 101 for protection. Thus, the assembling work of the electronic device accommodating unit 22 is completed.

In mounting the electronic device accommodating unit 22, firstly, the clamp 32 is inserted into the clamp hole formed in the bearing face of the vehicle body, so that the electronic device accommodating unit 22 is fixed temporarily. Next, the screwing through hole 77 in the earth terminal 31 is aligned with the screw hole formed in the bearing face, and then, a screw is fastened to fix the earth portion 78 of the earth terminal 31 to the bearing face. As this occurs, rotational torque produced when the screw is fastened is received by the clamp 32 which is fixed directly to the earth terminal 31. When the fixing of the earth portion 78 of the earth terminal 31 is completed, the mounting work of the electronic device accommodating unit 22 is completed.

Thus, as the embodiment has been described heretofore by reference to FIGS. 1 to 5, according to the invention, since the electronic device accommodating unit 22 has the elastic portion 201, even in a case that vibrations or shocks are transmitted to the electronic device accommodating unit 22 from the outside, the vibration of the electronic device main body 89 in the electronic device 29 can be suppressed. By so suppressing the vibration of the electronic device main body 89, load exerted on the weld portions of the leads 68, 69 of the electronic device 29 is reduced remarkably compared with the conventional electronic device accommodating unit, whereby good noise removal is maintained. In addition, according to the invention, since the electronic device accommodating unit has the elastic portion 201, the welding points P of the leads 68, 69 of the electronic device 29 can be stabilized.

[Second Embodiment]

A clamp will be described which can be used in place of the clamp 32 of the first embodiment. In this description, only the elastic portion is modified. Like reference numerals will be given to portions which are basically like to those of the first embodiment and the detailed description thereof will be omitted.

In FIG. 6A, an elastic portion 211 which is disposed on a rear face (a lower face) side of a base plate 86 of a clamp 32 has a contact portion 212 and a pair of spring portions 213. The contact portion 212 is disposed in a position which lies spaced apart from the base plate 86 and has a base side face which can be brought into abutment with the base plate 86 and a contact face 214 which is positioned on an opposite side to the base side face so as to be brought into contact with an electronic device main body 89. The base side face may not be brought into abutment therewith. The pair of spring portions 213 are formed so as to extend from the rear face (the lower face) of the base plate 86 at one ends thereof. In addition, the spring portions 223 are formed so as to connect to the contact portion 212 at the other ends thereof. The pair of spring portions 213 are formed to have elasticity.

[Third Embodiment]

In FIG. 6B, an elastic portion 221 which is disposed on a rear face (a lower face) side of a base plate 86 of a clamp 32 has a contact portion 222 and a spring portion 223. The contact portion 222 is disposed in a position which lies spaced apart from the base plate 86 and has a base side face which can be brought into abutment with the base plate 86 and a contact face 224 which is positioned on an opposite side to the base side face so as to be brought into contact with an electronic device main body 89. The base side face may not be brought into abutment therewith. The spring portion 213 is formed so as to extend from the rear face (the lower face) of the base plate 86 at one end thereof. The spring portion 223 is formed into a cantilever arm shape having elasticity. A pair of ribs 208 are formed on both sides of the elastic portion 221.

[Fourth Embodiment]

Hereinafter, a third embodiment will be described by reference to the figure. Like reference numerals will be given to constituent members and portions which are basically like to those of the first embodiment, and the detailed description thereof will be omitted.

Figure 7:
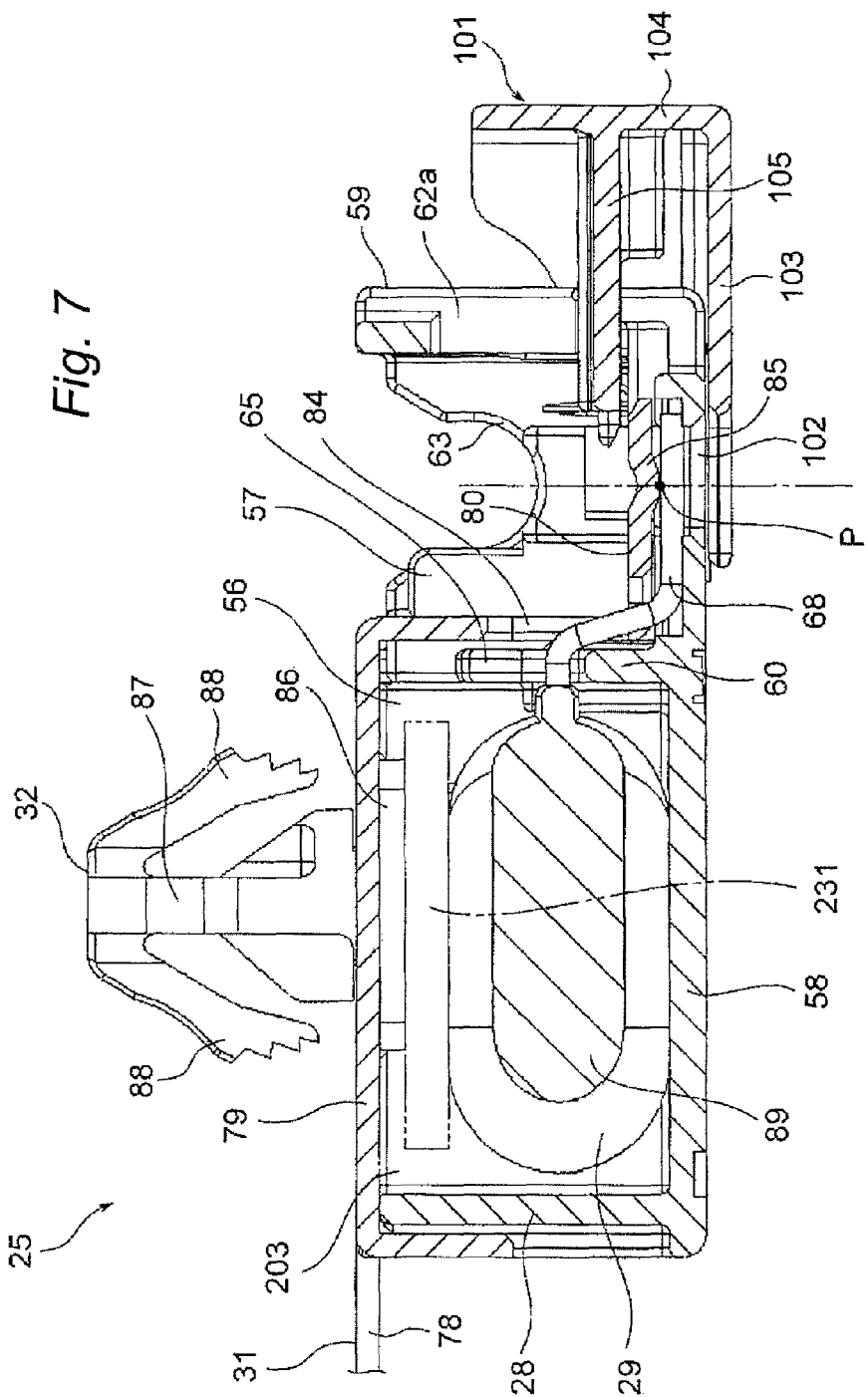
FIG. 7 is a sectional view of an electronic device accommodating unit according to a fourth embodiment of the present invention.

In FIG. 7, an elastic portion 231 which has elasticity and which is brought into contact with an electronic device main body 89 is disposed between a base portion 79 of an earth terminal 31 and an electronic device main body 89 of an electronic device 29. The elastic portion 231 is provided as any of an independent device, a portion that is integrated into the clamp 32 and a portion that is integrated into the base portion 79 or a portion that is integrated into a case 28 through hinge, not particularly shown, so as to be integrated into a lid member which covers an opening portion 203. As the independent device, for example, a sponge, rubber or a spring can be used for the elastic portion 231.

According to the embodiments as described above, when the clamp is attached to the housing, the elastic portion of the clamp is brought into elastic contact with the electronic device which is accommodated in the housing. In a case that vibrations or shocks are transmitted to the electronic device in the interior of the housing from the outside, the vibration of the device is suppressed by the existence of the elastic portion.

According to the embodiments as described above, for example, in the case of the device being vibrated largely, the ribs are brought into abutment with the device. An excessive elastic deformation of the elastic portion is restricted by the ribs.

According to the embodiments as described above, the elastic portion having elasticity is brought into contact with the electronic device main body which is accommodated in the first recess portion. In a case that vibrations or shocks are transmitted to the electronic device accommodating unit from the outside, the vibration of the electronic device main body is suppressed by the existence of the elastic portion.

According to the embodiments as described above, the elastic portion is not a single device but constitutes part of the lid portion or the clamp.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The invention can be applied not only to the electronic device accommodating unit 22 of the motor vehicle or the like but also to the field of domestic electric appliances, provided that an elastic portion is provided integrally or separately which is brought into contact with a device so as to press the device elastically within a housing.

In the case of being used in the field of motor vehicles, the invention is understood to be applied to electric junction boxes (a junction box (J/B), a relay box (R/B) or a vehicle electric device accommodating unit such as ECU or the like). This is because the electric junction boxes are such as to be fixedly locked on a vehicle body or a panel member in such a state that a device is accommodated within a housing thereof.

The disclosures of Japanese Patent Application No. 2009-106705 filed Apr. 24, 2009 including specification, drawings and claims is incorporated herein by reference in its entirety.

What is claimed is:

1. A clamp, comprising:
    a base portion connected to a housing accommodating a device;
    a clamping portion, provided outside the housing on a first face of the base portion to clamp a mating member;
    an urging portion, provided inside the housing on a second face of the base portion, having an elasticity, the device being urged in a case by the urging portion where the base portion is connected to the housing; and
    wherein the urging portion includes:
        a contacting part, having a first face in contact with the device; and
        a spring, connecting the contacting part to the base portion, and being elastically deformed as a result of the contacting part contacting with the device,
    wherein the spring includes a first member extending from a first side of the contacting part and a second member extending from a second side of the contacting part opposite to the first side,
    the contacting member being disposed between the first member and the second member.

2. The clamp as set forth in claim 1, wherein:
the spring includes a third member extending from the second side of the contacting part in parallel to the second member.

3. The clamp as set forth in claim 1, wherein:
the deforming part includes:
    a first member, extending from a first side of the contacting part, and connected to a third face of the base portion which connects the first face of the base portion and the second face of the base portion; and
    a second member, extending from a second side of the contacting part opposite to the first side, and connected to a fourth face of the base portion opposite to the third face.

4. The clamp as set forth in claim 1, wherein:
the deforming part is extended from the second face of the base portion so as to be a cantilever.

5. An electronic device accommodating unit, comprising:
    a housing, having a recess;
    a lid member, connected to the housing, and covering the recess to define an accommodating chamber accommodating a device;
    an urging member, provided on the lid member and disposed in the accommodating chamber, the urging member in contact with the device and to elastically urge the device,
    wherein the urging member includes:
        a contacting part, having a first face contacting with the device and a second face opposing a face of the lid member,
        a rib portion provided separated from the urging portion on the second face, and
        a spring connecting the contacting part to the lid member and being elastically deformed as a result of the contacting part contacting the device,
    wherein the rib portion includes a first rib and a second rib and the urging portion is disposed between the first rib and the second rib.

6. The electronic device incorporating unit as set forth in claim 5, further comprising:
    a clamp, provided with the lid member, monolithically formed with the urging member.

7. The electronic device incorporating unit as set forth in claim 5, wherein:
the lid member is monolithically formed with the urging member.

* * * * *